United States Patent [19]
Gaitten

[11] 3,837,382
[45] Sept. 24, 1974

[54] TREE CUTTING APPARATUS WITH IMPROVED CUTTING AND GRIPPING HEAD ASSEMBLY

[75] Inventor: Walden M. Gaitten, Sylacauga, Ala.

[73] Assignee: Kockum Industries, Inc., Talladega, Ala.

[22] Filed: June 1, 1973

[21] Appl. No.: 365,977

[52] U.S. Cl. .................. 144/34 E, 83/378, 83/610, 144/3 D
[51] Int. Cl. .......................................... A01g 23/08
[58] Field of Search ............ 83/378, 610; 144/34 R, 144/34 E, 34 A, 34 B, 3 D, 3 R, 2 Z, 309 AC, 2 N

[56] References Cited
UNITED STATES PATENTS

| | | | |
|---|---|---|---|
| 1,509,994 | 9/1924 | Carrol | 144/34 R UX |
| 3,461,929 | 8/1969 | Hunger et al. | 144/34 R |
| 3,540,501 | 11/1970 | Jonsson | 144/34 |
| 3,720,248 | 3/1973 | Mellgren | 144/34 R |
| 3,720,249 | 3/1973 | Peltonen | 144/309 AC |
| 3,731,720 | 5/1973 | Moser et al. | 144/34 E X |

*Primary Examiner*—Andrew R. Juhasz
*Assistant Examiner*—W. D. Bray
*Attorney, Agent, or Firm*—Cushman, Darby & Cushman

[57] ABSTRACT

A tree cutting and gripping head assembly for use in a tree felling apparatus which includes a single movement effecting unit, such as a hydraulic ram, connected both with respect to a tree cutting part and a tree gripping part of the head assembly for effecting movement for both of these parts through their respectively operative strokes in response to a single actuating movement of the unit. The head assembly also embodies a number of improved cutting blade constructions which are particularly useful in splitting the tree stump during cutting operation or otherwise forming pockets in the upper surface of the tree stump for retaining moisture which materially aids in the disintegration of the stump.

9 Claims, 13 Drawing Figures

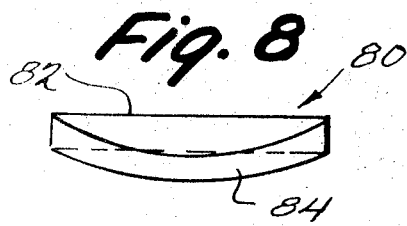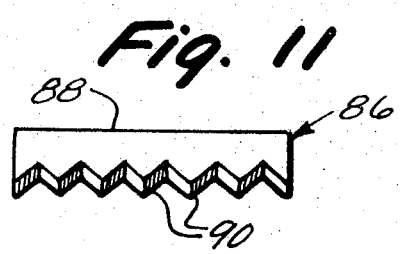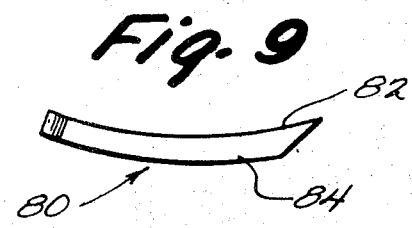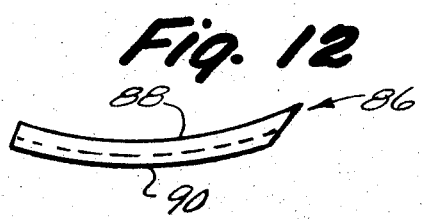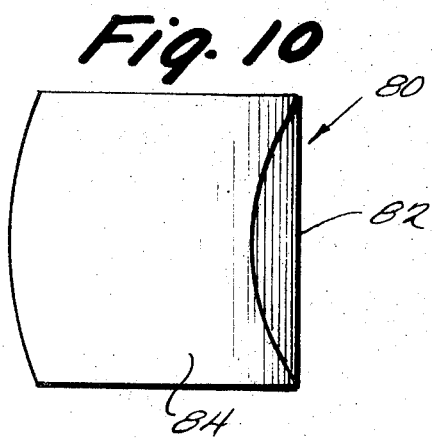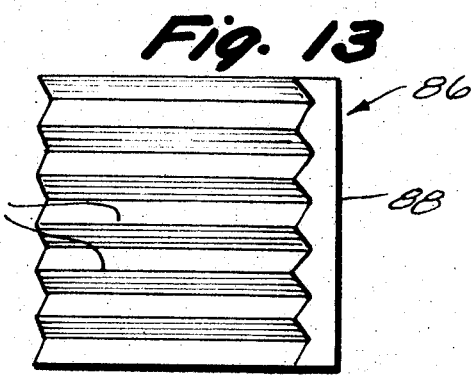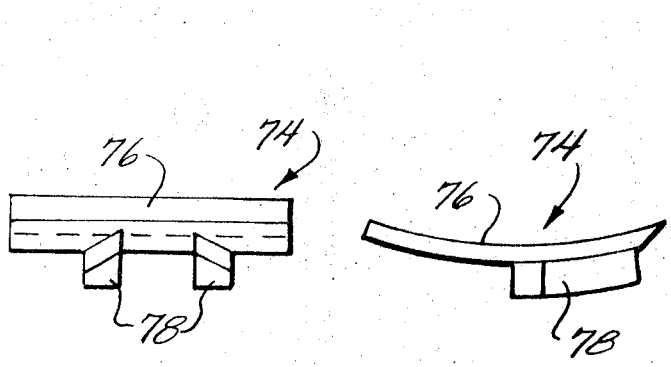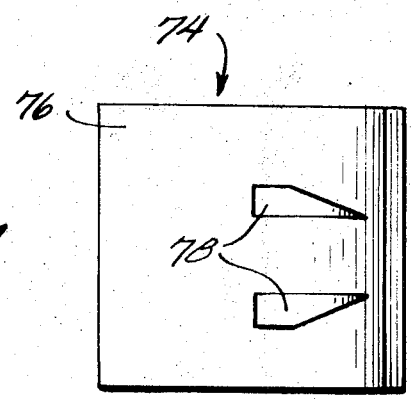

tree cutting apparatus with improved cutting and gripping head assembly

This invention relates to apparatus for felling standing trees and more particularly to an improved tree cutting and gripping head assembly for use in such apparatus.

Devices for felling standing trees embodying tree cutting and gripping head assemblies of the type in which the cutting means is moved through the tree trunk in a single operative stroke have come into widespread use. The cutting mechanism most commonly employed includes cooperating cutting blades movable through an operative stroke by a vertical pivotal action about a vertically extending axis or parallel vertical axes. In U.S. Pat. No. 3,461,929 there is disclosed a cutting mechanism which includes a pair of severing blades that are arcuate in transverse cross-section and are mounted for movement about parallel horizontal axes. The disclosure of this patent indicates that a cutting mechanism of this type is particularly advantageous over the more common type indicated above in that the tree can be severed closer to the ground, particularly under conditions where snow is covering the ground. A further advantage is asserted in the non-splitting cutting action because of the arcuate travel of the cutting blades. Moreover, the relatively narrow horizontal width of the blades when in an open position permits operation in close quarters. U.S. Pat. No. 3,540,501 discloses a cutting mechanism in which a pair of cutting blades are mounted for arcuate movement about an axis which forms an angle of at most 70° with respect to the horizontal. The blade or blades of the cutting mechanism are generally domed shape in configuration so as to form a cut in the tree trunk which leaves the upper surface of the stump in a concave dome-like configuration. This arrangement is disclosed as having the advantage of retaining water in the upper surface of the stump, which materially aids in stump deterioration.

In both of the mechanisms noted above, the overall apparatus includes a gripping mechanism for holding the tree at a position above the cutting position so that the severed tree can be controlled by the apparatus after the cutting action has been completed. The gripping mechanisms provided are separately actuated as is characteristic of all of the cutting and gripping head assemblies of the prior art.

An object of the present invention is to greatly simplify the structure and operation of a tree cutting and gripping head assembly of the type described thus enabling the head to perform the intended functions more effectively in a more economical manner. In accordance with the principles of the present invention, this objective is obtained by providing a single movement effecting unit, of the power operated linear movement type, which is operatively connected both with respect to a tree cutting part of the tree cutting and gripping head assembly and to a tree gripping part thereof for effecting movement of both of these parts through their respective operative strokes in response to a single actuating movement of the unit. Preferably, the cutting and gripping parts are mounted for pivotal movement about a common horizontally extending axis, thus enabling the assembly to obtain the advantages attributed to movements of this type, particularly as set forth above with respect to U.S. Pat. No. 3,461,929. Specifically, this arrangement not only provides a favorable cutting pattern and position in the tree trunk, but a favorable cutting force application and cutting action as well.

Another object of the present invention is the provision of a tree cutting and gripping head assembly which is simple in construction, effective in operation, and economical to manufacture and maintain.

Another object of the present invention is the provision of a cutting mechanism of the type described having an improved blade configuration for cutting the upper surface of the tree stump during the cutting action so as to materially aid in stump deterioration.

These and other objects of the present invention will become more apparent during the course of the following detailed description and appended claims.

The invention may best be understood with reference to the accompanying drawings wherein an illustrative embodiment is shown.

In the drawings:

FIG. 5 is a front elevational view of a cutting blade of modified form;

FIG. 6 is a side elevational view of the blade shown in FIG. 5;

FIG. 7 is a bottom view of the blade shown in FIG. 5;

Figure 1:
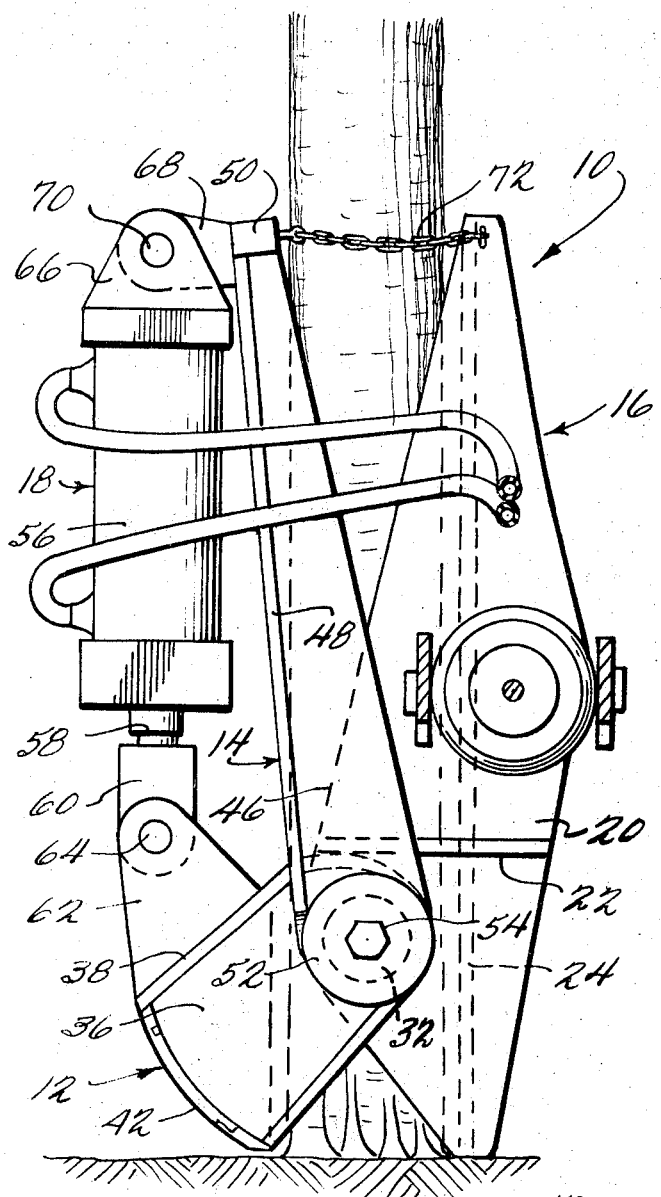
FIG. 1 is a rear elevational view of a tree cutting and gripping head assembly embodying the principles of the present invention illustrating the same in substantially surrounding relation to the trunk of a standing tree.

FIGS. 8, 9 and 10 are views similar to FIGS. 5, 6 and 7 of a further modified form of cutting blade; and FIGS. 11, 12 and 13 are views similar to FIGS. 5, 6 and 7 of a further modified form of cutting blade.

Referring now more particularly to FIGS. 1-4 of the drawings, there is shown therein a tree cutting and gripping head assembly, generally indicated at 10, embodying the principles of the present invention. It will be understood that the head assembly 10 may form a part of any known apparatus for felling standing trees. Such apparatus normally embodies a power driven vehicle having an articulated boom extending therefrom on which the tree cutting and gripping assembly 10 of the present invention is suitably mounted. Here again, any known type of connection may be utilized between the articulated boom and the head assembly 10. In the drawings the connection is of the type disclosed in U.S. Pat. No. 3,540,501, the related disclosure of which is hereby incorporated by reference into the present specification.

The preferred head assembly 10 of the present invention shown in the drawings is made up of four basic components, which include a cutting part, generally indicated at 12; a gripping part, generally indicated at 14; a rigid frame structure, generally indicated at 16; and a motion effecting unit, generally indicated at 18.

In the preferred embodiment, the rigid frame structure 16 provides a stationary part disposed in opposed relation to the cutting part 12 and a stationary part disposed in opposed relation to the gripping part 14 so that the cutting action is accomplished solely by the movement of the cutting part 12 and the gripping action is accomplished solely by the movement of the gripping part 14. While this construction is preferred, it will be understood that the present invention contemplates that either of the opposing parts may be made movable.

As shown, the rigid frame structure 16 is of welded plate construction including a forwardly facing vertical plate member 20 suitably strengthened along its rear face, as by a horizontal gusset plate 22 or the like. Extending forwardly from the member 20 is a vertical side plate member 24 which includes an upper gripping reaction part or portion and an integral lower cutting reaction part or portion. As shown, the welded connection of the side plate is strengthened by suitable exterior gusset plates 26 and an interior corner gusset plate 28. Extending forwardly from the outer vertically extending gusset plate 26 is a horizontally extending triangular guide plate 30.

Rigidly secured to the rear face of the plate member 20 is a rearwardly extending shaft 32 which defines a common horizontal axis of pivotal movement for the cutting part 12 and gripping part 14. The cutting part 12 includes a bushing 34 journaled on the shaft 32, and an apertured side plate 36 rigidly secured to the front face of the bushing 34. The side plate 36 includes an outer peripheral surface which is arcuate about the axis of the bushing and a peripheral plate 38 is rigidly secured to the remaining peripheral surfaces thereof. The peripheral plate 38 includes a laterally enlarged portion at the upper periphery of the side plate at a position between the arcuate peripheral surface thereof and the bushing 34 to the outer extremity of which is rigidly secured a second triangular side plate 40 having an arcuate peripheral surface parallel with the arcuate surface of the first side plate. Rigidly secured to the arcuate surfaces of the side plates 36 and 40 and the adjacent end of the peripheral plate 38 is a cutting blade 42. As shown, the cutting blade is formed of plate metal bent into a curved segmentally cylindrical configuration arcuate about the axis of the shaft 32. The lower edge of the blade 42 is formed with a cutting edge, which may, if desired, be provided by a replaceable forward blade portion.

The gripping part 14 likewise includes a bushing 44 journaled on the shaft 32 and an elongated side plate 46 rigidly secured to one side of the periphery of the bushing and extending generally upwardly therefrom. Rigidly secured to the outer edge of the side plate 46 is a plate member 48 having a triangularly shaped transversely enlarged portion. Rigidly secured to the outer end of the side plate 46 and the plate member 48 is a gripping bar 50 having suitable serrations or other tree gripping surfaces formed on one side thereof. It will be understood that any suitable means may be provided for retaining the bushings 34 and 44 of the cutting and gripping parts on the shaft 32 and, as shown, such means may take the form of a retaining washer 52 fixed to the free end of the shaft 32 as by a retaining bolt 54.

While the motion effecting unit 18 may take different forms, as shown it is of the double acting hydraulic piston and cylinder type including a cylinder member 56 and a piston rod member 58 mounted for linear movement through one end closure of the cylinder member. A suitable piston (not shown) is carried on the inner end of the piston rod member 58 and the outer end thereof has a pivot lug 60 secured thereto which extends between two upstanding pivot lugs 62 rigidly secured to the upper surface of the peripheral plate 38 of the cutting part 12. The lug 60 is pivotally interconnected with the lugs 62 by a suitable pivot pin 64.

Rigidly secured to the opposite end closure of the cylinder member 56 is a pair of pivot lugs 66 spaced apart to receive therebetween a pivot lug 68 rigidly secured to the bar 50 and adjacent portion of the plate member 48 of the gripping part 14. The lugs 66 and 68 are pivotally interconnected as by a pivot pin 70 or the like.

The pivotal axes of the pivot pins 64 and 70 are parallel with the axis of shaft 32 and so located with respect thereto that planes extending from the axis of pin 64 to the axes of the pin 70 and shaft 32 respectively define an obtuse angle therebetween in all positions of movement of the unit 18, while planes extending from the axis of pin 70 to the axes of the pin 64 and shaft 32 respectively define an acute angle therebetween in all positions of movement of the unit 18.

Figure 3:
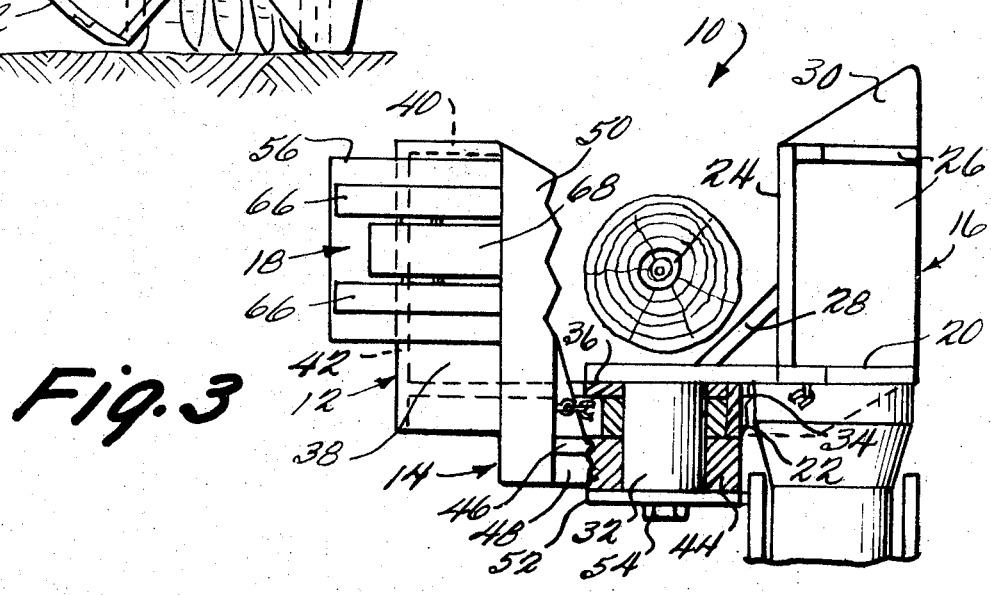
FIG. 3 is a top plan view of the head assembly with parts broken away for purposes of clearer illustration.
Figure 2:
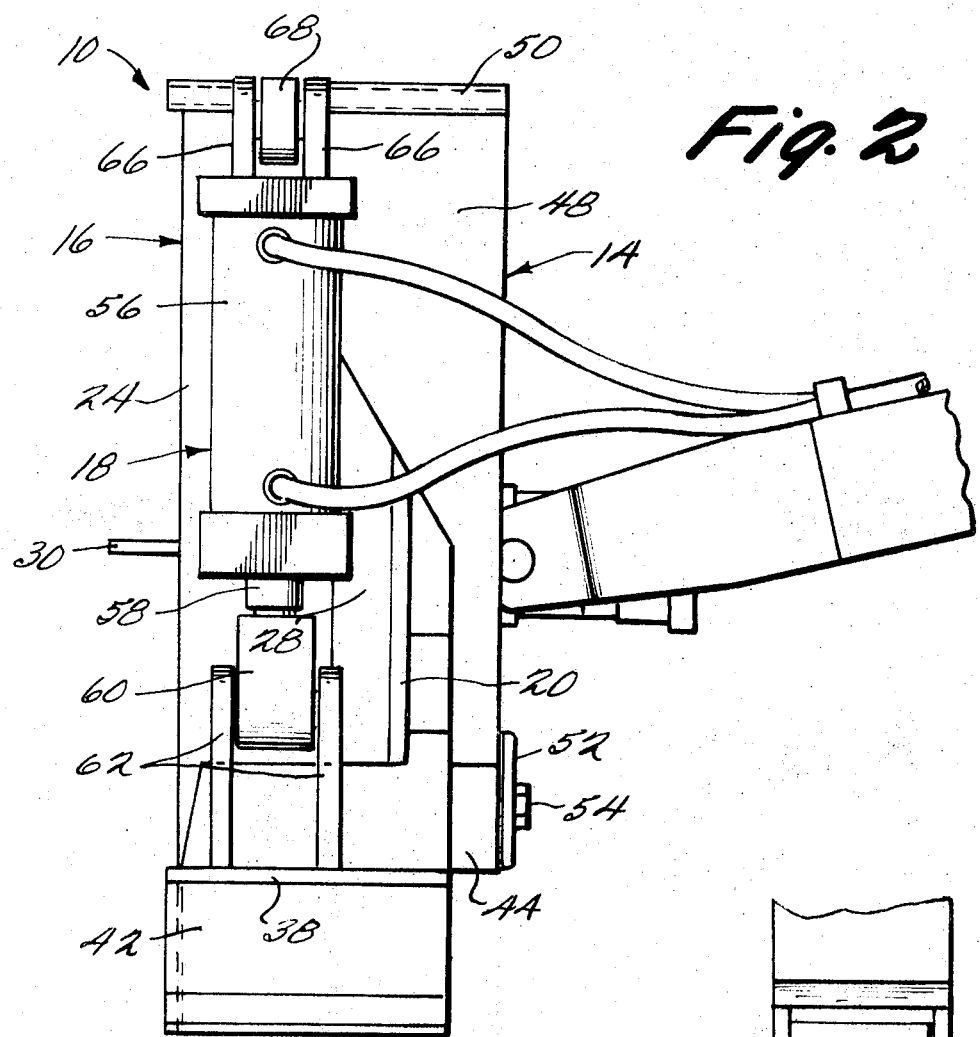
FIG. 2 is a side elevational view of the head assembly shown in FIG. 1.
Figure 4:
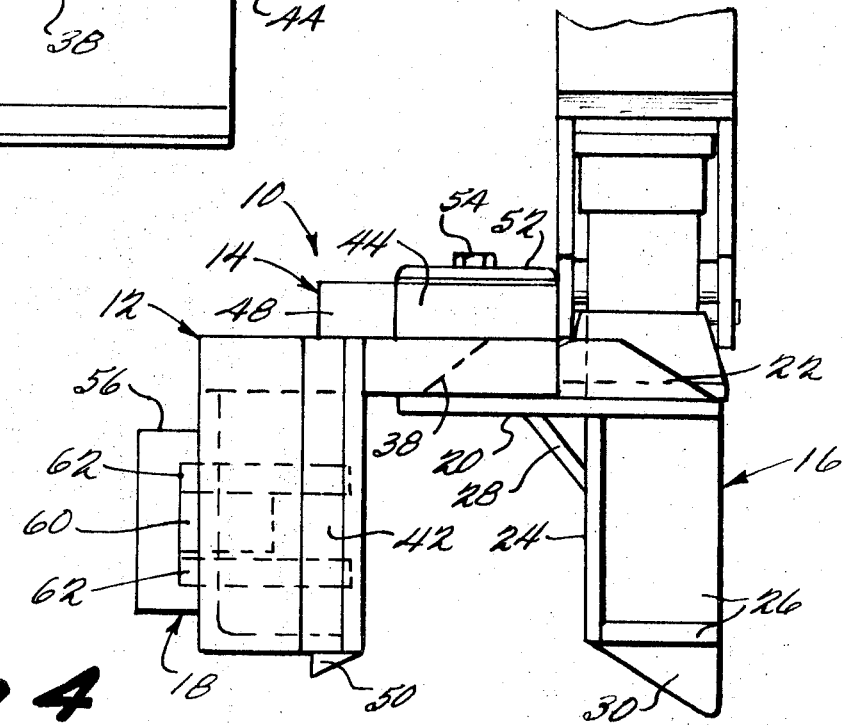
FIG. 4 is a bottom view of the head assembly.

In operation, it will be understood that the cutting and gripping head assembly 10 is to be used as part of a mobile tree felling apparatus, the head assembly 10 being articulately carried on the outer end of the boom of the apparatus so as to be moved in a substantially horizontal direction into substantially surrounding relation to a tree trunk, substantially shown in FIGS. 1 and 3. Since the cutting part 12 and gripping part 14 are both pivotally mounted with respect to the rigid structure 16 it will be readily apparent to those skilled in the art that an appropriate stop means must be provided for the purpose of maintaining the parts in a position to be moved into surrounding relation with the tree, as aforesaid. Such a stop means is illustrated in the drawings as comprising a length of chain 72 which is suitably connected between the upper ends of the rigid structure 16 and the gripping part 14.

The motion effecting unit 18 is mounted for rectilinear movement between first and second positions in accordance with conventional practice. The unit 18 is shown in FIG. 1 in its first or retracted position and it will be noted that when the unit is actuated by the operator it will be moved in an expanding mode from the first position shown toward the second position thereof. During this movement, pivotal movement of both the cutting part 12 in a counterclockwise direction about the pivotal axis of the shaft 32 and the gripping part 14 in a clockwise direction about the axis of the shaft 32 will take place. As the gripping part is moved, the gripping bar 50 moves toward the upper part of the side plate 24 of the rigid structure 16 thus gripping the tree trunk therebetween at a gripping position thereon. In addition, the cutting edge of the cutting blade 42 is moved toward the lower part of the side plate 24 into cutting engagement with the tree trunk at a cutting position spaced below the gripping position. Continued movement of the unit 18 toward its second position will move the cutting blade arcuately through the tree trunk, thus severing the same. It will be noted that the cutting edge will engage the surface of the side plate 24 at the completion of this movement when the unit 18 has reached its second position.

At the completion of the movement, the tree trunk is severed and gripped and thus can be handled by the apparatus in accordance with the mechanisms and procedures provided by the overall apparatus. It will be understood that by reversing the direction of movement of the unit 18 from its second position into its first position, the cutting and gripping parts will be moved back into the position as shown in FIG. 1 permitting the cutting and gripping head assembly 10 to be moved into operative relation with the next tree to be felled.

It will be noted that the spacing of the pivotal axes of the pins 64, 70 and the shaft 32 provide a highly desirable force application for effecting the cutting action. The cutting part and gripping part form in essence a toggle linkage, the arrangement of the axes of the pivot pins 64 and 70 and shaft 32, as aforesaid, enabling the force of the unit to be applied to the gripping part with a small component of movement and to the cutting part with a relatively large component of movement.

It will also be noted that the arrangement enables the cutting blade to obtain all of the advantages heretofore attributable to cutting blades having a pivotal movement through its cutting stroke about a horizontal axis. It will be understood that while the preferred cutting blade 42 as shown and described above is of segmental cylindrical construction, it is within the contemplation of the present invention to form the blade of a segmental spherical construction as well as other configurations.

In FIGS. 5-7 there is illustrated a blade construction 74 of modified form which is particularly advantageous in that it provides for the splitting of the stump during the cutting action. As shown, the blade construction 74 includes a cutting blade 76 configured substantially identical to the blade 42 previously described. However, the convex lower surface of the blade is provided with stump splitting lug means which, as shown, is in the form of a pair of lugs 78 mounted in transversely spaced relation with respect to each other, the lugs being generally wedge-shaped in configuration. It will be understood that a single lug can be provided or that more than two lugs may be provided. Moreover, the lugs may be provided in connection with any configuration including a segmental spherical blade.

FIGS. 8-10 illustrate a further modified form of a blade construction, generally indicated at 80. The blade construction 80 is similar to the blade construction 42 previously described in that the upper surface 82 thereof is of segmental cylindrical configuration. The lower surface is of segmental spherical configuration as indicated at 84. The lower surface is thus not only convexly arcuate in a direction from front to rear but in a perpendicular direction as well. Clearly, the transverse convexity could be planar as well as arcuate.

FIGS. 11-13 illustrate still another form of blade construction, generally indicated at 86. In this embodiment, the upper surface 88 of the blade is segmentally cylindrical as aforesaid and the lower surface thereof is provided with serrations 90. The serrations, which may be curved as well as straight, act in a similar manner to the lugs 78 previously described. Here again, it will be understood that the upper surface 88 may be provided with serrations parallel to those provided by the lower surface, so that the blade is of substantially uniform thickness throughout.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In an apparatus for felling trees, a tree cutting and gripping head assembly operable to be moved generally horizontally in one direction into substantially surrounding relation to the trunk of a standing tree, said head assembly when disposed in said substantially surrounding relation to a tree trunk providing a cutting part disposed on one side of the tree trunk in generally opposed relation to a part disposed on the other side thereof and a gripping part disposed on one side of the tree trunk in generally opposed relation to a part disposed on the other side thereof, means mounting said cutting part and said gripping part for movement of each through an operative stroke in a direction toward the part opposed thereto, cutting means on said cutting part cooperating with the part opposed thereto to engage and cut the tree trunk at a cutting position in response to the movement of said cutting part through its operative stroke, gripping means on said gripping part cooperating with the part opposed thereto to engage and grip the tree trunk at a gripping position spaced above said cutting position in response to the movement of said tree gripping part through its operative stroke, a movement effecting unit including two members mounted for power operated generally linear movement with respect to each other from a first position into a second position, and means connected with said members of said unit operatively connecting said unit both with respect to said tree cutting part and to said tree gripping part for effecting movement of both said tree cutting part and said tree gripping part through their respective operative strokes in response to the aforesaid power operated relative movement of said members from said first position toward said second position.

2. Apparatus as defined in claim 1 wherein said head assembly includes a rigid tree trunk engaging structure constituting a part thereof which is opposed to both said cutting part and said gripping part.

3. Apparatus as defined in claim 2 wherein said mounting means supports said cutting part and said gripping part on said rigid structure for pivotal movement through their respective operative strokes.

4. Apparatus as defined in claim 2 wherein said mounting means supports said cutting part and said gripping part on said rigid structure for pivotal movement through their respective operative strokes about a common pivotal axis which extends generally horizontally through the tree trunk intermediate said cutting and gripping positions.

5. Apparatus as defined in claim 4 wherein said mounting means includes a single pivot pin fixed to said rigid structure and pivotally receiving both said cutting part and said gripping part.

6. Apparatus as defined in claim 5 wherein said cutting means includes a cutting blade fixed to said cutting part, said cutting blade extending generally arcuately about the axis of pivotal movement of said cutting part.

7. Apparatus as defined in claim 4 wherein the members of said unit comprise a cylinder and a piston rod having one end thereof extending through one end of said cylinder, a piston on said one piston rod end slidably mounted within said cylinder.

8. Apparatus as defined in claim 7 wherein said unit connecting means includes pivot means between the opposite ends of said cylinder and said piston rod and said cutting and gripping parts pivotally interconnecting the unit with said cutting and gripping parts about axes parallel with the common pivotal axis thereof.

9. Apparatus as defined in claim 8 wherein planes extending from the pivotal axis of said unit with said gripping part to the pivotal axis of said unit with said cutting part and to the aforesaid common pivotal axis respectively define an acute angle therebetween in all positions of movement of said unit and planes extending from the pivotal axis of said unit with said cutting part to the pivotal axis of said unit with said gripping part and to the aforesaid common pivotal axis respectively define an obtuse angle therebetween in all positions of movement of said unit.

* * * * *